(12) United States Patent
Fiorello et al.

(10) Patent No.: US 9,217,288 B1
(45) Date of Patent: Dec. 22, 2015

(54) POWER ICE SCREW SYSTEM AND METHODS OF USE

(71) Applicants: Albert Fiorello, Greenwood Village, CO (US); William Fiorello, Greenwood Village, CO (US)

(72) Inventors: Albert Fiorello, Greenwood Village, CO (US); William Fiorello, Greenwood Village, CO (US)

( * ) Notice: Subject to any disclaimer, the term of this patent is extended or adjusted under 35 U.S.C. 154(b) by 184 days.

(21) Appl. No.: 13/969,478

(22) Filed: Aug. 16, 2013

(51) Int. Cl.
*A63B 29/00* (2006.01)
*E21B 7/00* (2006.01)
*A63B 29/02* (2006.01)
*B23B 41/00* (2006.01)

(52) U.S. Cl.
CPC .............. *E21B 7/008* (2013.01); *A63B 29/02* (2013.01); *A63B 29/025* (2013.01); *B23B 41/00* (2013.01); *Y10S 248/925* (2013.01)

(58) Field of Classification Search
CPC ......... E21B 10/02; E21B 7/008; E21B 10/44; A63B 29/025; A63B 29/027; A63B 29/028; B23B 41/00; B23B 35/00; B23B 11/00; Y10S 248/925
See application file for complete search history.

(56) References Cited

U.S. PATENT DOCUMENTS

| | | | | |
|---|---|---|---|---|
| 1,621,662 | A * | 3/1927 | Gartin | E21B 19/086 92/113 |
| 4,640,552 | A * | 2/1987 | Page | E02B 15/02 175/17 |
| 5,118,061 | A | 6/1992 | Byrne et al. | |
| 5,213,170 | A * | 5/1993 | Savitski | E21B 17/22 175/323 |
| 5,782,442 | A | 7/1998 | Kwak et al. | |
| 5,937,466 | A | 8/1999 | Brainerd et al. | |
| 6,102,135 | A * | 8/2000 | Shaw | E21B 11/005 175/20 |
| 6,505,799 | B1 | 1/2003 | Bercaw et al. | |
| 6,607,340 | B2 | 8/2003 | Petzl et al. | |
| 6,626,250 | B1 * | 9/2003 | Ham | A01K 97/01 175/18 |
| 6,705,412 | B1 * | 3/2004 | Wark | A01K 97/01 175/121 |
| 7,347,403 | B2 | 3/2008 | Belcourt et al. | |
| D718,613 | S * | 12/2014 | Petzl | A63B 29/02 D8/387 |
| 8,899,897 | B2 * | 12/2014 | Maurice | A63B 29/025 411/387.1 |
| 2004/0240954 | A1 * | 12/2004 | Chilcott | E21B 7/008 408/239 A |
| 2005/0205298 | A1 * | 9/2005 | Kollasch | F25C 5/04 175/18 |
| 2006/0169492 | A1 * | 8/2006 | Kowalewski | A01K 97/01 175/18 |
| 2008/0179105 | A1 * | 7/2008 | Duncan | B23B 51/0426 175/420.1 |

(Continued)

FOREIGN PATENT DOCUMENTS

| | | | | |
|---|---|---|---|---|
| DE | 3705347 | A1 * | 9/1988 | ........... A63B 29/025 |
| DE | 4304618 | C1 * | 3/1994 | ........... A63B 29/025 |
| EP | 1491238 | B1 | 6/2004 | |

(Continued)

*Primary Examiner* — Daniel P Stephenson
(74) *Attorney, Agent, or Firm* — Leyendecker & Lemire, LLC (57) ABSTRACT

A power ice screw system including an ice screw and screw adapter configured to engage the ice screw, thus enabling use of a power drill to install the ice screw in an ice feature, is described. The ice screw includes a drive head configured to engage the screw adapter. The screw adapter includes clearing ports that enable the adapter to expel ice that enters the adapter from within the ice screw hollow core. The ice screw core extends through the drive head to permit ice to flow through the ice screw and into the adapter. A cutting member resides within the screw adapter, typically disposed between two clearing ports. The cutting member can be flanked by two flanges configured to direct ice that has been disrupted by the cutting member outwardly through the clearing ports. The power drill is typically a lightweight battery powered electric drill.

20 Claims, 8 Drawing Sheets

(56) References Cited

U.S. PATENT DOCUMENTS

| | | | |
|---|---|---|---|
| 2008/0199336 A1* | 8/2008 | Brensinger | A63B 29/02 417/472 |
| 2011/0225793 A1 | 9/2011 | Daniels, III | |
| 2013/0101366 A1* | 4/2013 | Sanders | B23B 51/0406 408/1 BD |
| 2014/0099169 A1* | 4/2014 | Maurice | B23D 67/10 407/29.15 |

FOREIGN PATENT DOCUMENTS

| | | | | |
|---|---|---|---|---|
| FR | 2568131 | A1 * | 1/1986 | A63B 29/025 |
| FR | 2572941 | A1 * | 5/1986 | A63B 29/025 |
| FR | 2863899 | A1 * | 6/2005 | A63B 29/02 |
| FR | 2978052 | A1 * | 1/2013 | A63B 29/025 |
| GB | 2462836 | A * | 2/2010 | A63B 29/025 |
| WO | WO 2015023594 | A2 * | 2/2015 | A63B 29/02 |

* cited by examiner

POWER ICE SCREW SYSTEM AND METHODS OF USE

FIELD OF THE INVENTION

The present invention relates generally to devices and methods for using ice screws while ice climbing, and more specifically to devices and methods for driving the ice screws into ice by use of a power tool.

BACKGROUND

Ice climbers usually use ice screws to create anchor points in ice features the climbers are attempting to climb. The ice screws are typically temporarily installed in the ice as a lead climber (leader) ascends, and carabiners are often affixed to the installed ice screw. Climbing rope is generally passed through the carabiner such that if the leader falls, his or her belayer can arrest the fall by preventing the rope from running up through the carabiner from the belayer's position beneath the leader. With the climbers (leader and belayer), rope, and ice screw/carabiner so configured, force of the leader's fall is transmitted to the ice screw from the rope, and the leader is suspended from the ice screw after falling as far as slack in the rope permits. To successfully arrest the leader's fall, the ice screw must be securely installed in the ice so it does not pull out when force from the fall is transmitted to the ice screw. A following climber may remove the ice screws as he or she follows the leader's route.

The leader must usually install an ice screw with one hand because his or her other hand is occupied by grasping an ice tool (such as an ice axe), the pick of which the leader generally embeds in the ice above his or her head to help maintain a perch on the ice. The one-handed installation typically requires the leader to push against the ice screw while simultaneously rotating the screw, which initiates boring into the ice by a cutting tip of the screw.

A climber must frequently chip a small hole or depression in the ice with an ice tool, and subsequently initiate boring of the ice screw in the small hole. The initial boring of the ice screw is typically accomplished by the climber twisting his or her wrist and forearm, and is usually performed in multiple increments of rotation. Increments of rotation are typically limited to a range of about 60 degrees to about 180 degrees due to physiological constraints of human wrist/forearm rotation. When the climber first initiates boring into the ice with the ice screw, before the screw establishes sufficient purchase to remain in the ice in the absence of assistance from the climber, the climber must, between screw rotation increments, simultaneously maintain pressure on the screw and unwind his or her wrist/forearm without unscrewing the ice screw. This initial boring requires considerable finesse, and must be repeated for each screw installed during a climb. Not surprisingly, the risk of dropping ice screws inadvertently while attempting to install the screws is a concern.

Where a climber is using one arm for installing an ice screw in the ice, fatigue in his or her other arm and shoulder is exacerbated because the climber is using only one arm instead of two for maintaining his or her perch on the ice. Strength available for other physically demanding aspects of ice climbing is consequently diminished. Means for reducing the time it takes to install an ice screw, and the exacerbated fatigue that accompanies such installation, is therefore needed. Reducing the risk of dropping an ice screw when first starting an installation is also highly desirable.

DETAILED DESCRIPTION

Embodiments of a power ice screw system according to the present invention comprise a screw adapter configured to engage and twist an ice screw. The system further comprises an ice screw equipped with a drive head configured to engage the screw adapter. The screw adapter is typically removably or semi-permanently coupled to a relatively lightweight battery powered electric drill. For the purposes of the present invention, power drill refers to drills, impact drivers, hammer-drills, and similar power tools designed and configured to rotate a cutting tool or driving tool, such as, but not limited to, a spade bit, a twist drill bit, a screw driver bit, a torx driver bit, external torx sockets, hex bits, and standard sockets configured to receive and drive hexagonal bolts and nuts. Power drills are typically, but not necessarily, electrically powered. The power ice screw system enables more rapid and facile placement of the ice screw in ice features, compared to manual ice screw placement. Thus by use of the power ice screw system, a climber can avoid manual insertion of ice screws, thereby diminishing the fatigue and risk of dropping a screw that typically accompanies manual insertion.

The screw adapter typically, but not necessarily, resembles a modified hex socket for a socket wrench. Accordingly, the screw adapter includes a drive head receptacle configured to receive a hexagonal bolt, nut, or drive head. A cutting member resides within the adapter, typically disposed between two debris clearing ports residing in cylindrical outer walls of the adapter. The cutting member can be flanked by two flanges configured to direct ice that has been disrupted by the member outwardly through the debris clearing ports.

Where the drive head receptacle of the screw adapter is hexagonal, ice screws for use with the adapter include a drive head sized and configured to be received within and securely engaged by drive head receptacle. Such a drive head resembles a hexagonal nut or bolt head.

In typical use, the screw adapter is affixed to a power drill, and a climber engages the drive head of an ice screw with the drive head receptacle. The climber then places a cutting tip of the ice screw against an ice feature and activates the power drill to bore into the ice with the screw. The climber generally does not need to chip a small hole or depression in the ice to get the ice screw started, as is typically required for manual installation of ice screws. The term ice feature refers to a frozen water fall, ice covered rock, glacier, crevasse, or similar ice formation, including man-made ice formations, typically ascended by ice climbers.

Ice screws typically include a hollow shaft that is open on each end because ice must be able to pass through the hollow shaft and subsequently exit the screw through an open end during placement of the screw in ice. Ice screws that become plugged are difficult or impossible to install. Accordingly, when boring into ice with an ice screw, an ice core typically passes from the cutting tip of the screw, through the hollow shaft, and out through the drive head, which is also typically hollow. An open ended cavity of the ice screw thus extends through the hollow shaft and the drive head, and the ice core is free to pass through the drive head and into the screw adapter. The ice core is then typically disrupted by the spinning cutting member and ejected out the debris clearing ports.

TERMINOLOGY

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

The terms "removable", "removably coupled", "removably installed," "readily removable", "readily detachable", "detachably coupled", "separable," "separably coupled," and similar terms, as used in this specification and appended claims, refer to structures that can be uncoupled, detached, uninstalled, or removed from an adjoining structure with relative ease (i.e., non-destructively, and without a complicated or time-consuming process), and that can also be readily reinstalled, reattached, or coupled to the previously adjoining structure.

Directional or relational terms such as "top," bottom," "front," "back," "above," "beneath," and "below," as used in this specification and appended claims, refer to relative positions of identified elements, components, or objects, where the components or objects are oriented in an upright position as normally installed or used.

A First Embodiment Power Ice Screw System

A first embodiment power ice screw system 100 is illustrated in FIGS. 1-8. The first embodiment power ice screw system 100 comprises a screw adapter 110, an ice screw 150, and a power drill 175. The power ice screw system can also include an ice screw holster 185, shown in FIG. 8. The power drill of the first embodiment is typically, but not necessarily, a Makita model DT01 cordless impact drive powered by a lithium ion battery.

The screw adapter 110 includes a drive head receptacle 114 disposed at an adapter first end 115 and a first debris clearing port 118 disposed in an outer wall 120 of the screw adapter 110. The outer wall of the first embodiment is typically cylindrical. A second debris clearing port 119 resides in the outer wall 120 opposite the first debris clearing port (i.e. disposed 180° around the screw adapter 110 from the first port 118). The screw adapter 110 further comprises a cutting member 125 flanked by two flanges 127. The two flanges 127 meet at the cutting member 125 and diverge away from the cutting member as they approach the clearing ports 118, 119. The cutting member 125 of the first embodiment includes two flat inclined sides that meet at an angle to form an edge. The angle is preferably less than 90°, more preferably less than 45°, and most preferably less than 30°. In some embodiments, the cutting member includes a point formed by two flat inclined sides meeting at an acute angle. Variations include serrated cutting members.

The screw adapter 110 typically further comprises one or more protrusions 130 adapted to engage a complementary recess 155 in a flat side of the drive head 157 of the ice screw 150. Collectively, the protrusion 130 and the recess 155 form a detent that secures the ice screw 150 in the adapter and reduces the chances of the screw 150 becoming inadvertently dislodged from the adapter 110. The detent enables one-handed use of the power ice screw system. A user can generally readily dislodge the ice screw 150 from the adapter 110 by pulling the drill and adapter away from the ice screw after installation in ice. The protrusions 130 of the first embodiment screw adapter are ball bearings that reversibly intrude into the receptacles 114 by each protrusion protruding through a flat side 117 of the hexagonal receptacle 114. A spring housing 132 for each protrusion contains a spring that holds the protrusion 130 in place intruding into the receptacle 114 until force of the spring is overcome to push the protrusion 130 partially or fully out of the receptacle 114.

Figure 1:
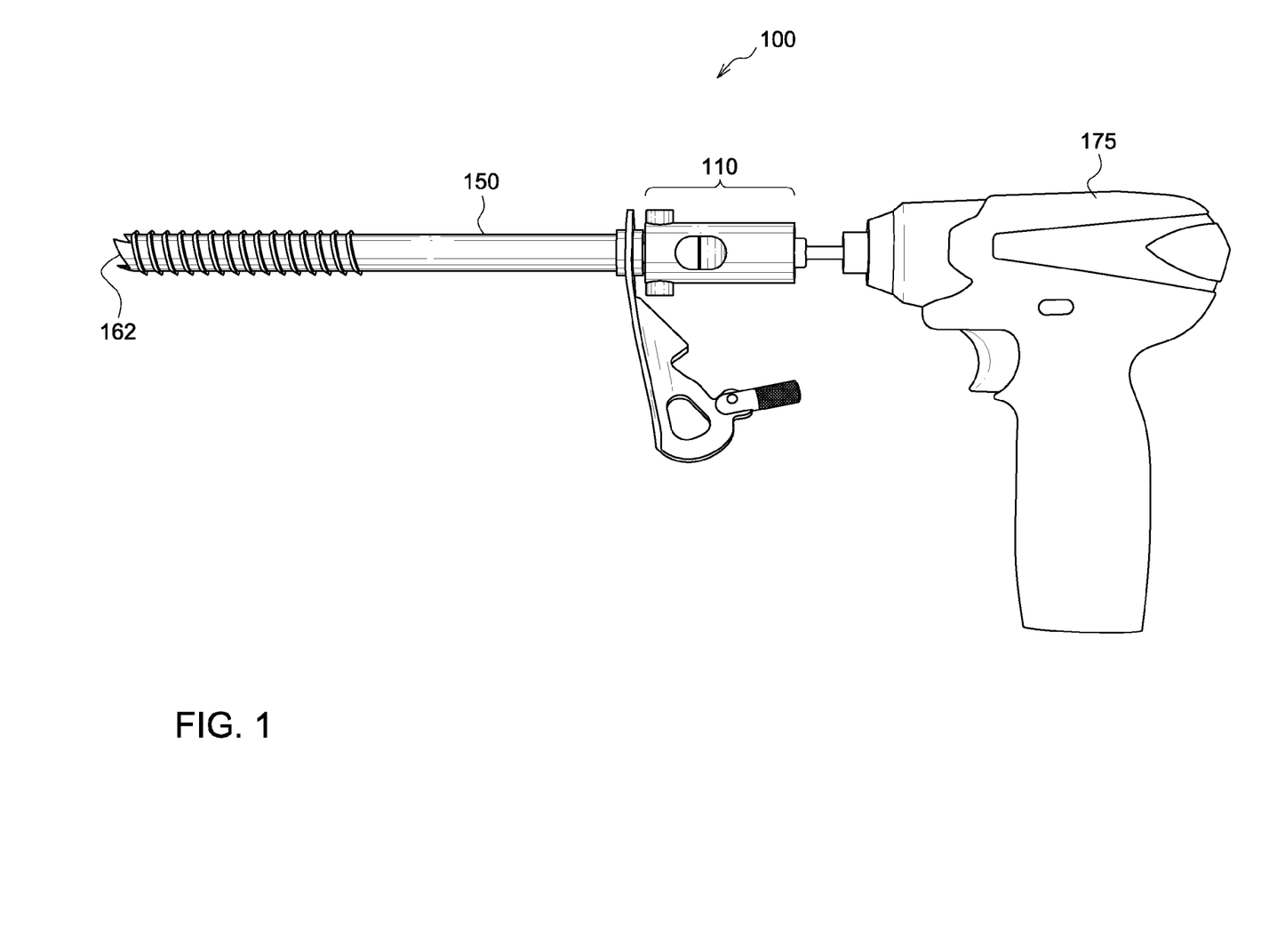
FIG. 1 is a side, elevation view of power ice screw system according to an embodiment of the present invention.
Figure 2:
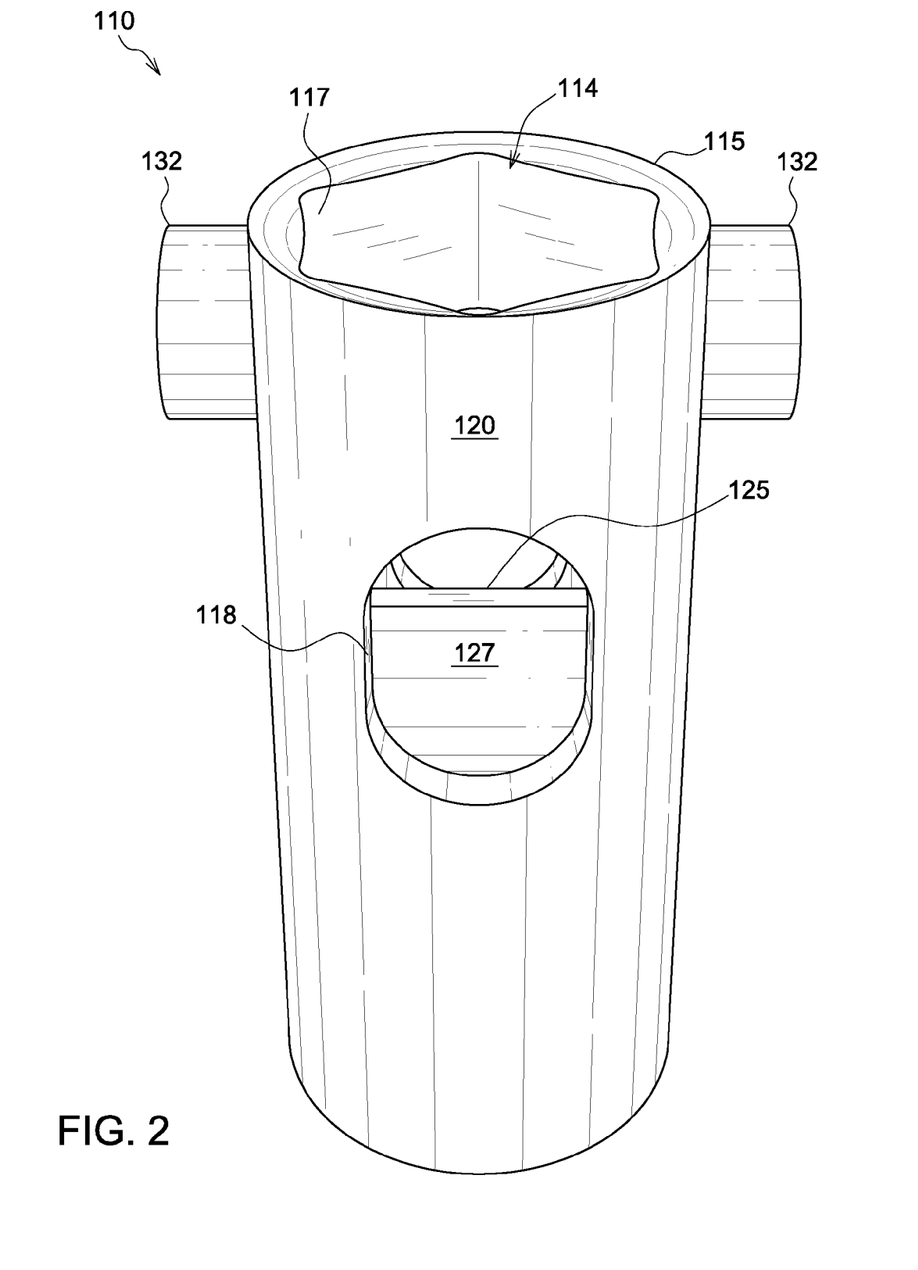
FIG. 2 is a side, perspective view of a screw adapter of a power ice screw system according to an embodiment of the present invention.
Figure 3:
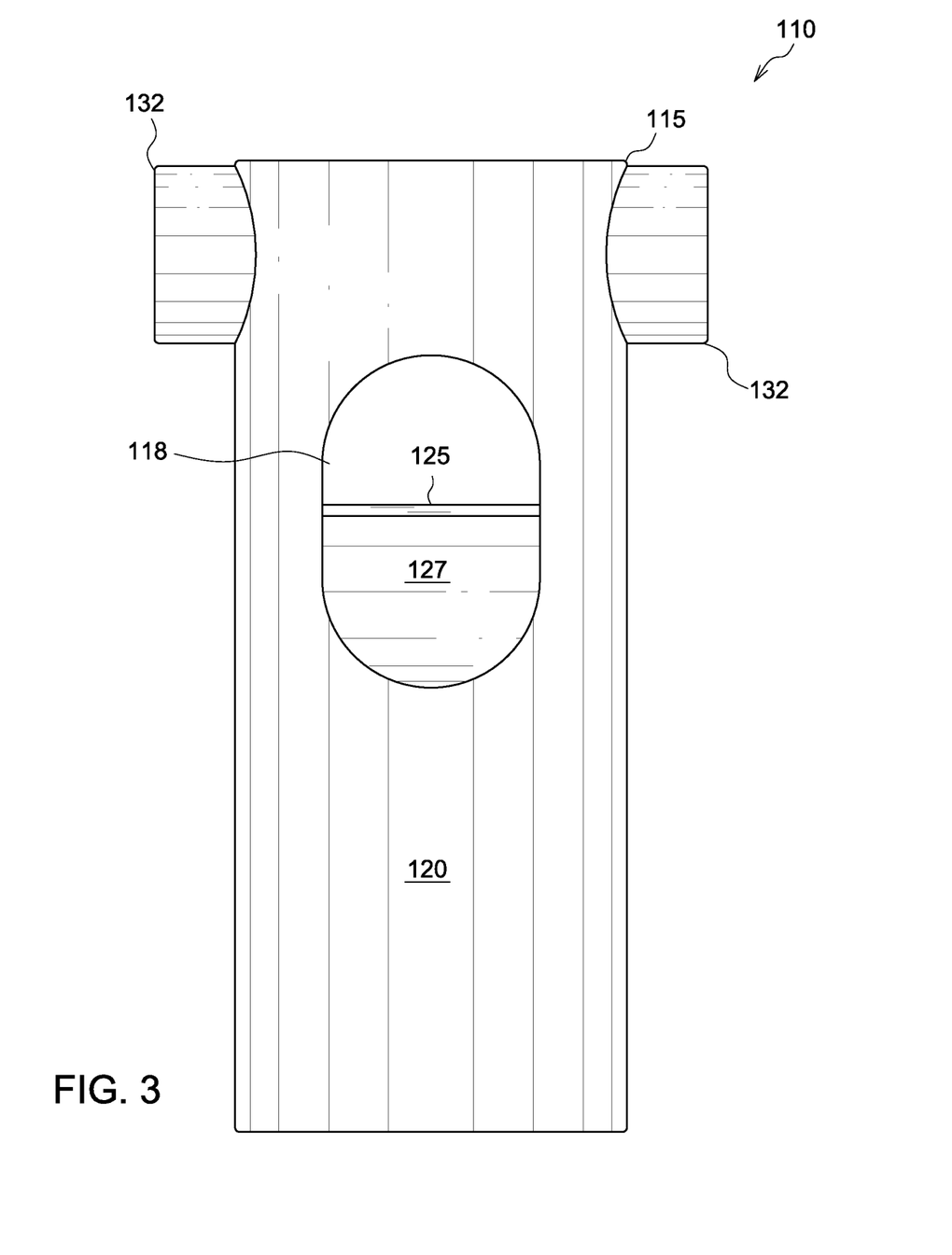
FIG. 3 is a side, elevation view of a screw adapter of a power ice screw system according to an embodiment of the present invention.
Figure 4:
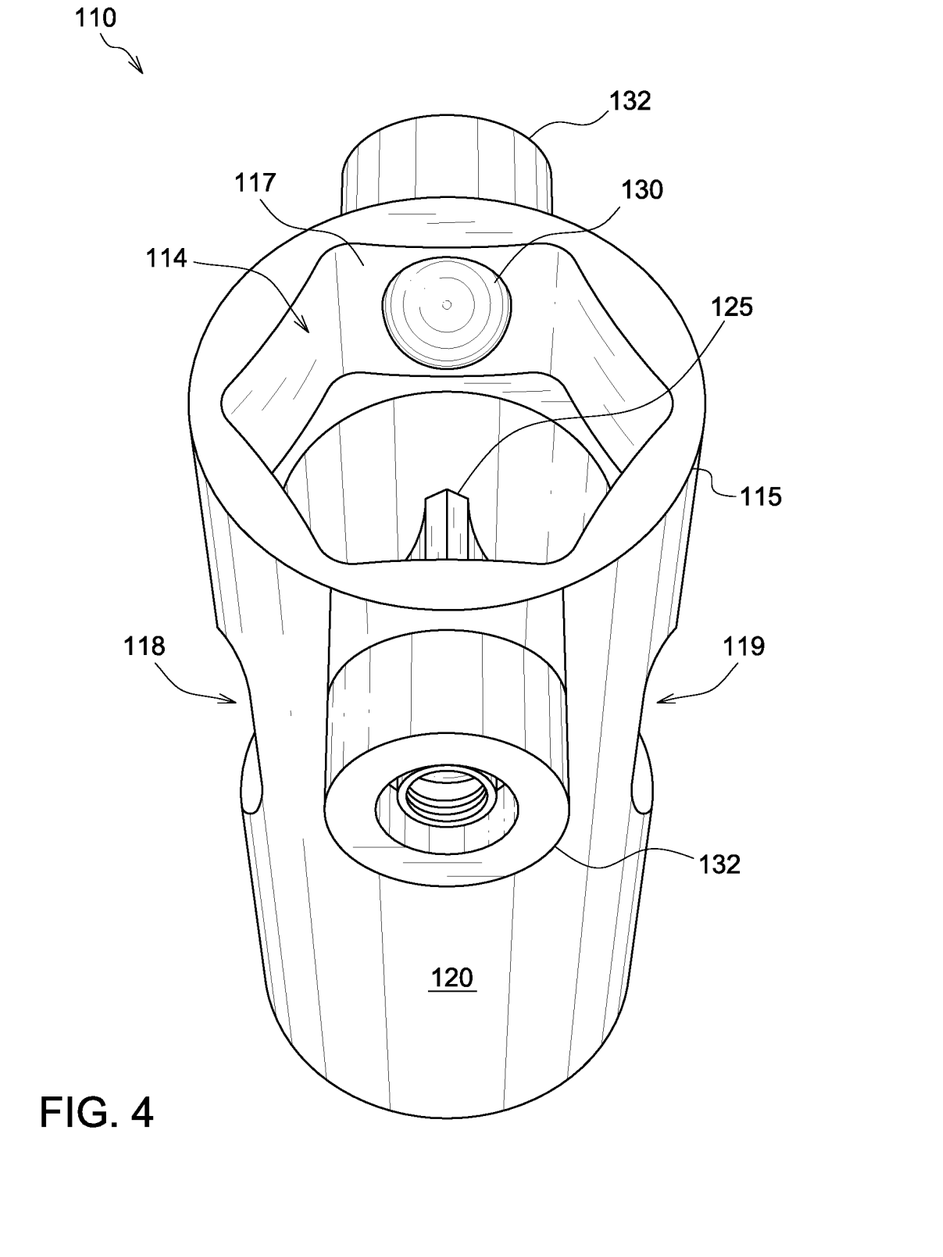
FIG. 4 is a perspective view of a screw adapter of a power ice screw system according to an embodiment of the present invention.
Figure 5:
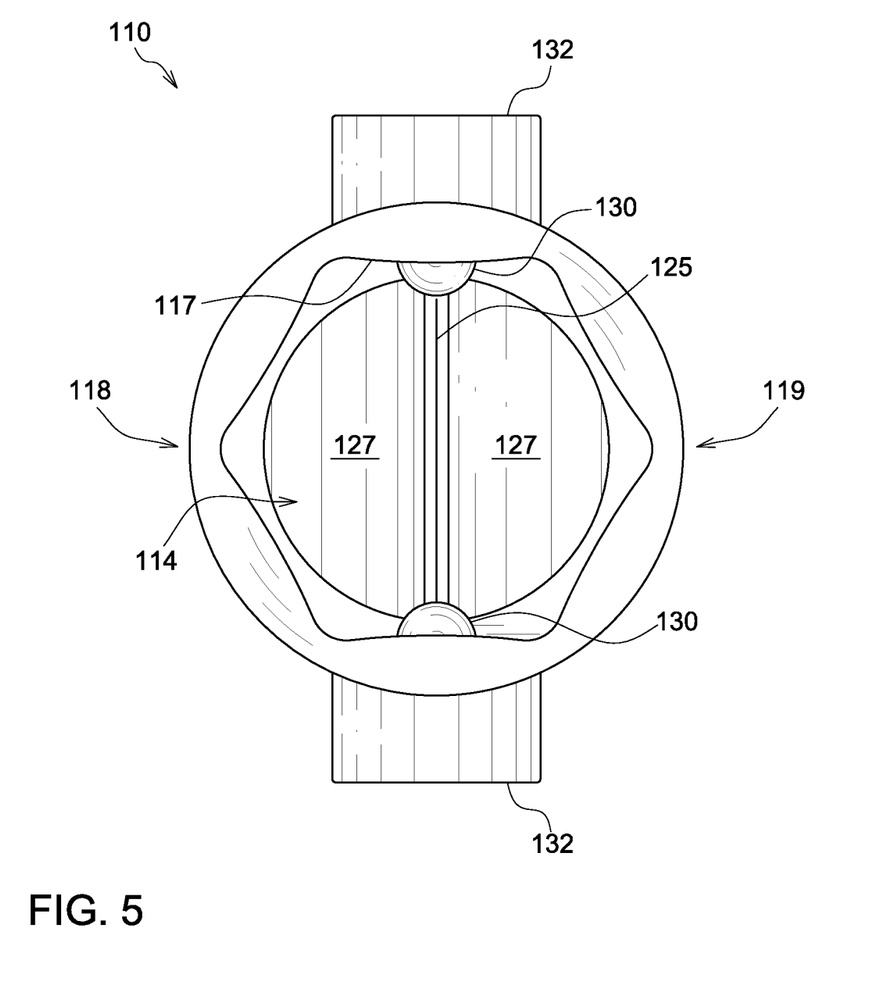
FIG. 5 is a plan, first end view of a screw adapter of a power ice screw system according to an embodiment of the present invention.
Figure 6:
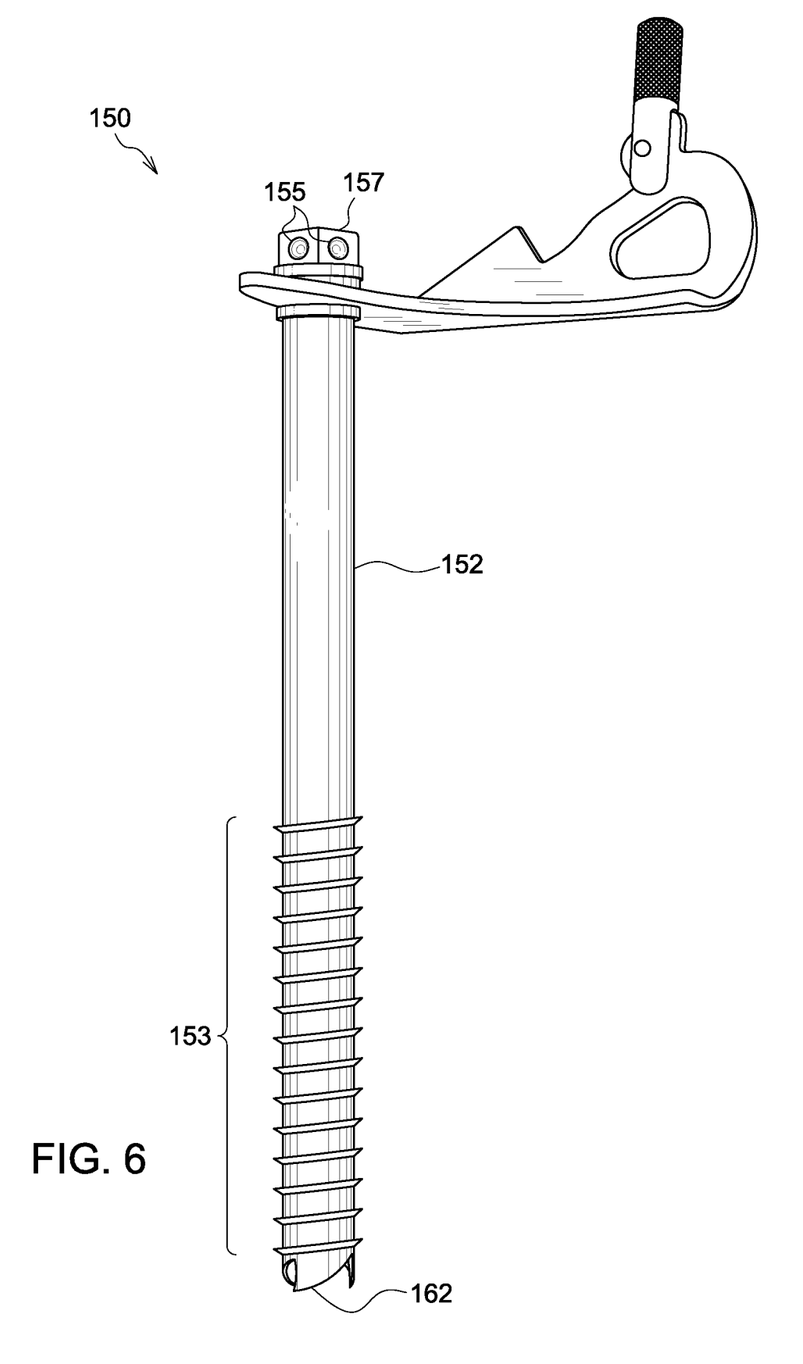
FIG. 6 is a side, elevation view of an ice screw of a power ice screw system according to an embodiment of the present invention.
Figure 7:
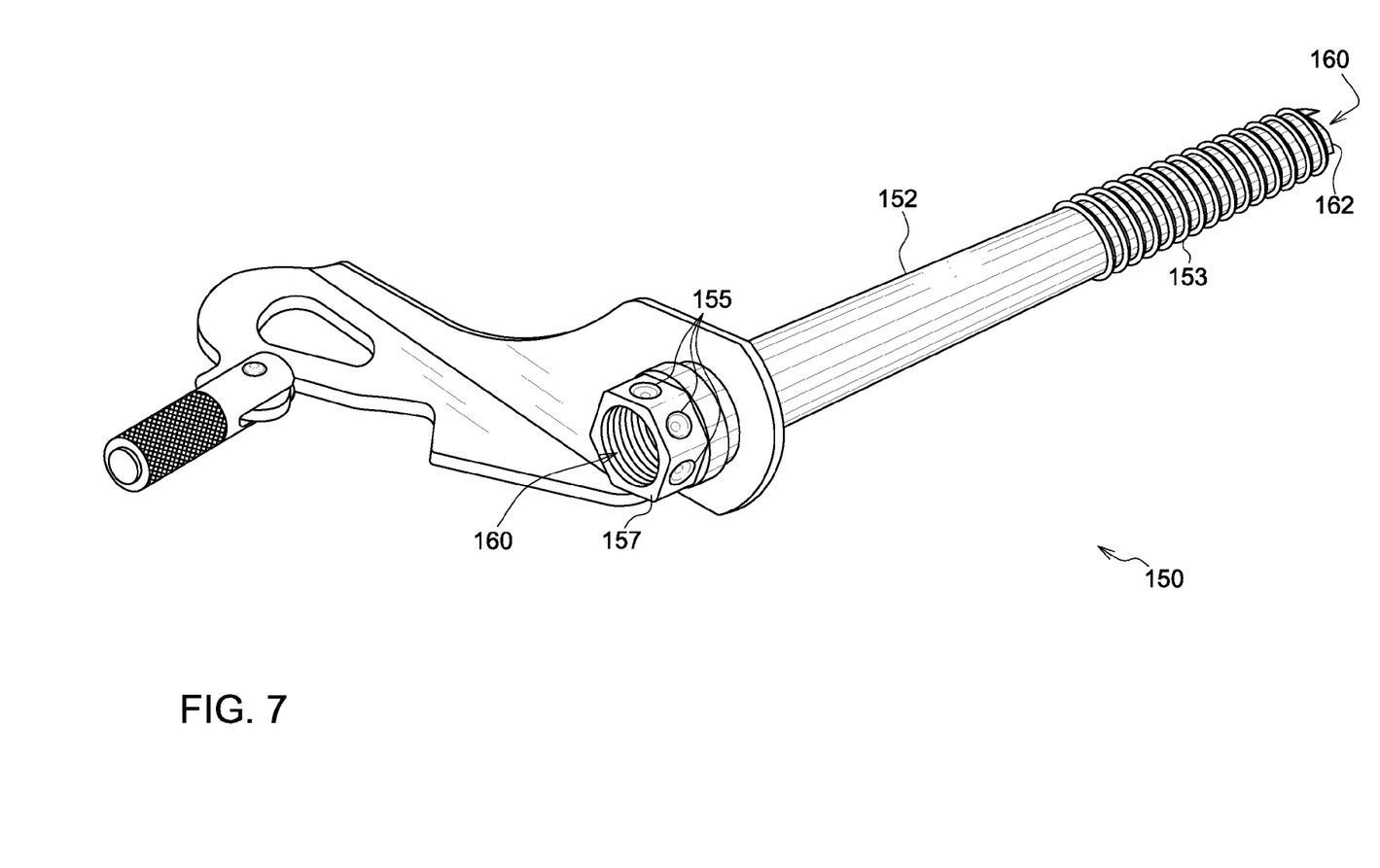
FIG. 7 is a perspective view of an ice screw of a power ice screw system according to an embodiment of the present invention.

As best seen in FIGS. 6 and 7, the ice screw 150 of the first embodiment power ice screw system includes a hollow shaft 152 on which are disposed external threads 153. The ice screw 150 further comprises a drive head 157 configured to be received and engaged by the receptacle 114 of the screw adapter 110. An open ended cavity 160 extends completely through the ice screw 150, from a cutting tip 162 of the screw 150 through the drive head 157. As best seen in FIG. 7, the open ended cavity 160 extends through the drive head 157, which results in the drive head 157 having a hollow center.

The first embodiment ice screw 150 typically includes a handle 165 for manual operation. The handle is typically used to remove the ice screw from the ice. The handle is typically not used when the ice screw is being driven by a power drill, in which case the handle rotates harmlessly.

Figure 8:
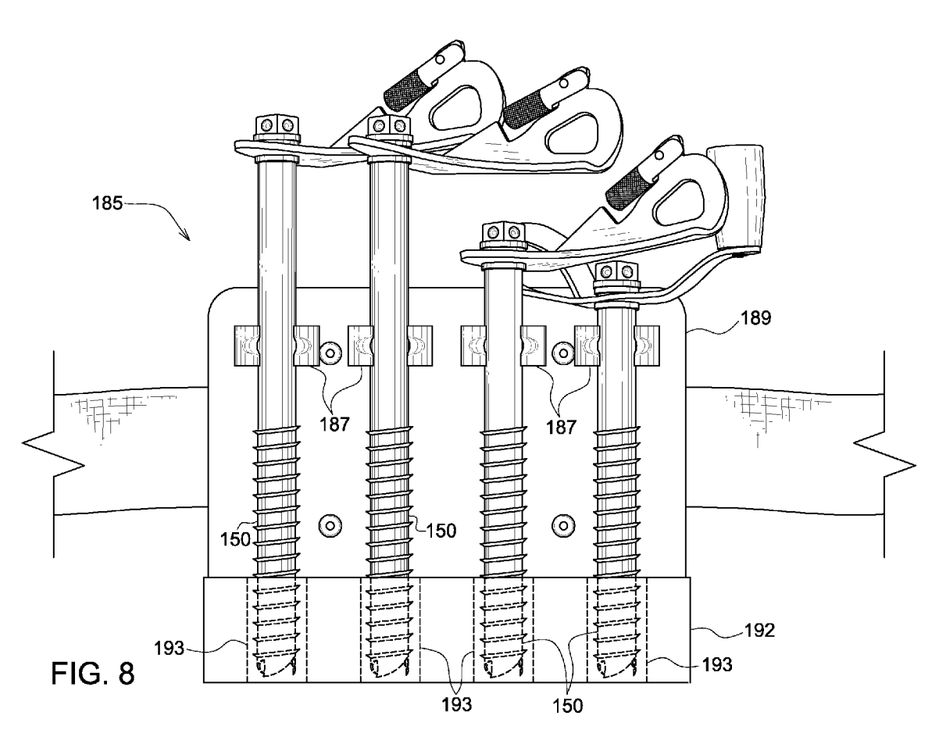
FIG. 8 is a side, elevation view of an ice screw holster of a power ice screw system according to an embodiment of the present invention.

As best shown in FIG. 8, the ice screw holster 185 of the first embodiment includes multiple screw catches 187, each of which is configured to hold a single ice screw 150 in an upright position. The ice screw holster 185 further comprises a lower compartment 192 configured to hold the an ice screw end. The lower compartment typically includes one or more slots or tubes 193, each configured to receive an ice screw cutting tip and a portion of an ice screw hollow shaft while the ice screw is held upright by the screw catches 187.

The ice screw holster 185 is typically, but not necessarily, worn at an ice climber's waist by use of a waist belt. Because a climber can assume a variety of positions while climbing ice, the ice screw holster 185 is built to hold the ice screw securely in various orientations, including upside down. The ice screw holster 185 facilitates one-handed operation of the power ice screw system, wherein a climber places a receptacle of a drill mounted screw adapter over an ice screw drive head. The detent of the adapter/ice screw combination secures the drive head in the receptacle, which enables the climber to remove the screw from the ice screw holster without needing to grasp the screw with his or her hand. Accordingly, the climber can hold his or her perch with one hand on an ice tool, the other hand holding the power drill with an ice screw adapter mounted thereto, and remove an ice screw from the rack with the drill/adapter combination. The climber can then actuate the power drill and perform a one-handed installation of the ice screw in an ice feature. In some embodiments, the ice screw holster includes a waist belt. Variations include an ice screw holster built into or otherwise integrated with a climbing harness.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

Variations include ice screws having surfaces having non-stick or low friction properties. Such surfaces include Teflon or similar non-stick coatings, ceramic surfaces, and nano surface coatings. A portion of the hollow core of the screw can included non-stick or low friction properties to facilitate passage of an ice core through the screw. In some embodiments, a threaded external surface of the screw includes non-stick or low friction properties.

I claim:

1. A power ice screw system comprising:
   a power drill;
   an ice screw including an ice cutting tip, a drive head, and an open ended extending from the cutting tip through the drive head;
   a screw adapter including:
      a receptacle disposed at an adapter first end, the ice screw drive head residing in the receptacle and being engaged therewith;
      an adapter second end engaging the power drill;
      a debris clearing port proximate the receptacle, the debris clearing port being configured to permit ice to exit the adapter while the ice screw resides in the receptacle and the second end engages the power drill; and
      a cutting member proximate the debris clearing port.

2. The system of claim 1, wherein a continuous void extends from the receptacle to the debris clearing port.

3. The system of claim 2, wherein the ice cutting adapter further comprises a flange configured to direct ice from the cutting member through the debris clearing port.

4. The system of claim 3, wherein the receptacle and the drive head collectively include a detent configured to prevent the ice screw from falling from the receptacle when the drive head is engaged within the receptacle.

5. The system of claim 4, wherein the drive head includes a hexagonal head.

6. The system of claim 5, wherein the receptacle includes a protuberance and the hexagonal head includes a recess on a hexagonal head flat side, the protuberance engaging the recess to prevent the ice screw from falling from the screw adapter.

7. The system of claim 6, wherein the protuberance and the recess include at least two of each structure.

8. The system of claim 7, wherein the hexagonal head includes a recess on each of six hexagonal flat sides.

9. The system of claim 3, wherein the screw adapter further comprises a cylindrical wall, and the debris clearing port includes an aperture in the cylindrical wall.

10. The system of claim 9, wherein the debris clearing port includes two clearing ports disposed on opposite sides of the screw adapter, and the cutting member resides between the two clearing ports.

11. The system of claim 1, further comprising an ice screw holster including:
    multiple ice screw catches, each of the multiple ice screw catches configured to securely hold a single ice screw in and upright position and in a configuration where both the ice screw holster and the single ice screw is upside down.

12. A method of using the power ice screw system of claim 1 comprising:
    engaging the screw adapter with the power drill;
    boring the ice screw into an ice feature, said boring including;
    an ice core traveling through the open ended cavity and into the screw adapter;
    disrupting the ice core with the cutting member; and
    a disrupted portion of the ice core exiting the screw adapter through the debris clearing port while the ice screw remains engaged with the screw adapter.

13. A power ice screw system comprising:
    an ice screw including an ice cutting tip, a drive head, and an open ended cavity extending from the cutting tip through the drive head;
    a screw adapter including:
       a receptacle disposed at an adapter first end and configured to receive and engage the ice screw drive head;
       a second end configured to engage a power drill;
       a debris clearing port proximate the receptacle, the debris clearing port being configured to permit ice to exit the adapter while the ice screw resides in the receptacle and the second end engages the power drill; and
       a cutting member proximate the debris clearing port.

14. The system of claim 13, wherein:
    a continuous void extends from the receptacle to the debris clearing port; and the ice cutting adapter further comprises a flange configured to direct ice from the cutting member through the debris clearing port.

15. The system of claim 14, wherein the screw adapter further comprises a cylindrical wall, and the debris clearing port includes an aperture in the cylindrical wall.

16. The system of claim 15, wherein the debris clearing port includes two clearing ports disposed on opposite sides of the screw adapter, and the cutting member resides between the two clearing ports.

17. A power ice screw system comprising a screw adapter including:
   a cylindrical outer wall;
   a receptacle disposed at an adapter first end and configured to receive and engage an ice screw drive head;
   a second end configured to engage a power drill;
   a debris clearing port residing in the cylindrical wall, wherein a continuous void extends from the receptacle to the debris clearing port;
   a cutting member residing within the cylindrical outer wall proximate the debris clearing port.

18. The system of claim 17, wherein the receptacle is hexagonal and is configured to receive and engage a hexagonal drive head.

19. The system of claim 18, further comprising a drill to which the screw adapter is coupled.

20. A method of using the power ice screw system of claim 13 comprising:
   engaging the screw adapter with a power drill;
   engaging the ice screw with the screw adapter;
   boring the ice screw into an ice feature, said boring including;
   an ice core traveling through the open ended cavity and into the screw adapter;
   disrupting the ice core with the cutting member; and
   a disrupted portion of the ice core exiting the screw adapter through the debris clearing port while the ice screw remains engaged with the screw adapter.

* * * * *